Oct. 23, 1962 T. J. RYAN 3,060,296
MOTION TRANSLATING MECHANISM
Filed Oct. 9, 1958 5 Sheets-Sheet 3

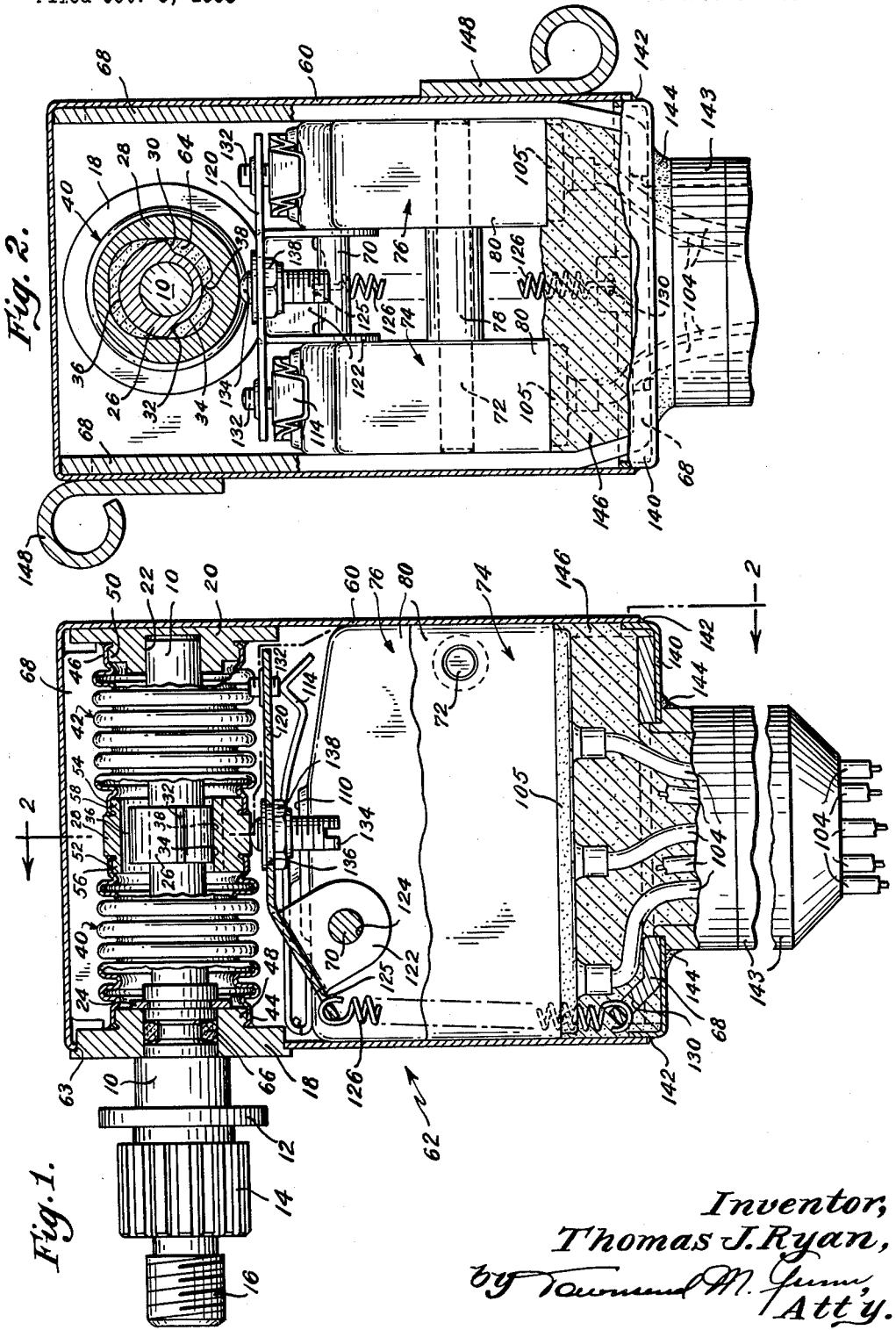

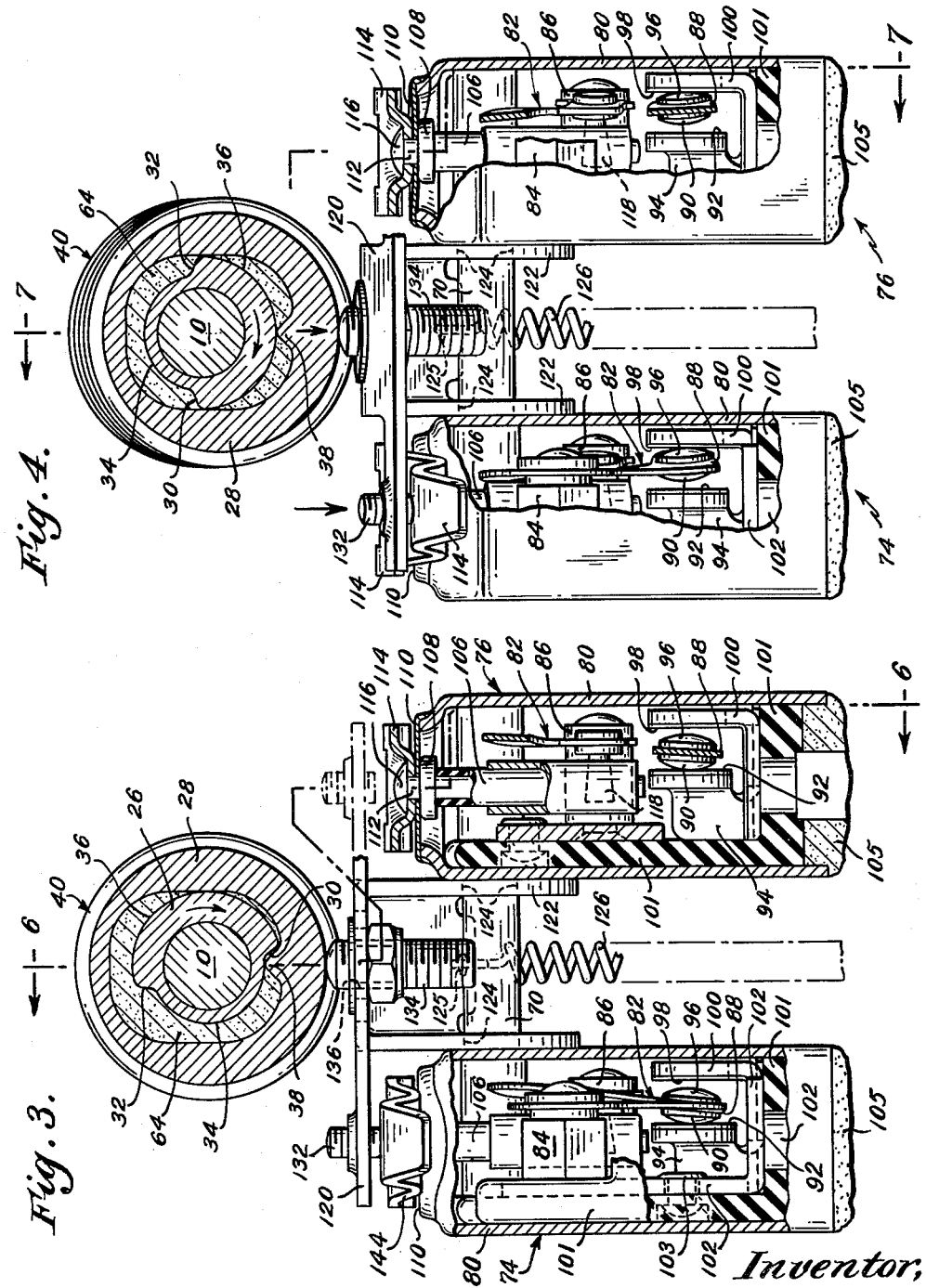

Inventor,
Thomas J. Ryan,
by Townsend M. Gunn
Att'y.

Oct. 23, 1962 T. J. RYAN 3,060,296
MOTION TRANSLATING MECHANISM
Filed Oct. 9, 1958 5 Sheets-Sheet 4

Inventor,
Thomas J. Ryan,
by Townsend M Gunn
Att'y.

Oct. 23, 1962 T. J. RYAN 3,060,296
MOTION TRANSLATING MECHANISM
Filed Oct. 9, 1958 5 Sheets-Sheet 5

Inventor,
Thomas J. Ryan,
by Townsend McGunn
Att'y.

3,060,296
MOTION TRANSLATING MECHANISM
Thomas J. Ryan, Rehoboth, Mass., assignor to Texas Instruments Incorporated, Dallas, Tex., a corporation of Delaware
Filed Oct. 9, 1958, Ser. No. 766,244
12 Claims. (Cl. 200—168)

This invention relates to a motion translating mechanism.

Among the objects of this invention are the provision of a new and improved motion translating mechanism; the provision of such a motion translating mechanism which is dependable in operation and economical to construct; the provision of such a motion translating mechanism which is capable of being hermetically sealed from the remainder of the interior of a container within which at least a portion of it is disposed; and the provision of such a motion translating mechanism capable of hermetically sealing, exteriorly of itself, the interior of a container within which it is mounted, which container is otherwise hermetically sealed from the circumambient atmosphere.

Further objects will become apparent as the description proceeds.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 1 is an elevational view of a device embodying the instant invention with certain of the parts being broken away;

FIG. 2 is a sectional view taken along line 2—2 in FIG. 1;

FIG. 3 is a view based on FIG. 2 but on a slightly enlarged scale, certain of the parts being broken away and the cam member of the device being shown in the position just prior to depression of the cam-following member;

FIG. 4 is a view similar to FIG. 3 but showing the cam member and cam-following member in their respective positions during full depression of the cam-following member;

Figure 6:
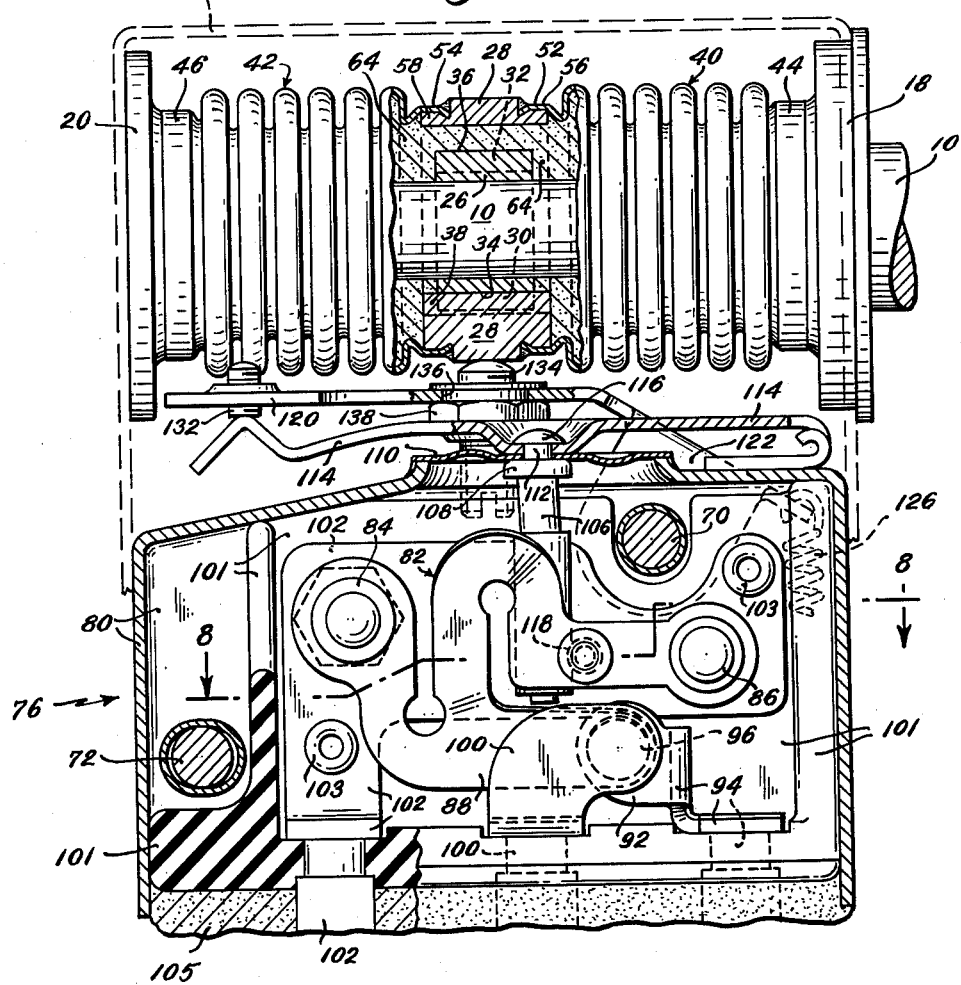
FIG. 6 is a sectional view taken along line 6—6 in FIG. 3.
Figure 5:
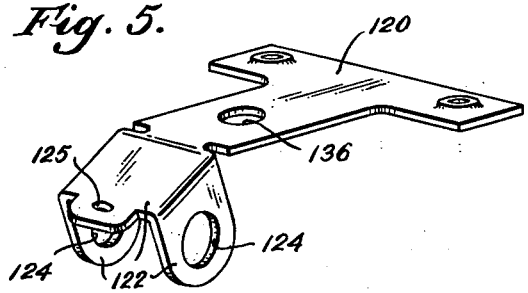
FIG. 5 is a perspective view of the electrical switch operating lever according to the embodiment shown in the drawings.

Referring to FIGS. 1–4, the motion translating mechanism of the invention includes a rotary shaft 10 having a flange 12, a splined portion 14 and a threaded portion 16 for connection of the shaft in conventional manner to the means for supplying the input motion of the motion translating mechanism. By way of example, the motion translating mechanism of the invention is useful in such applications as engine controls and industrial equipment, and is shown and described herein in the environment of a unit for indicating the position of the landing gear of an aircraft. In this latter regard, shaft 10 would be connected for rotary movement thereof in response to raising and lowering the landing gear of the aircraft thereby to indicate the position of the landing gear to the pilot by means of on-off lights appropriately connected to electrical switches later to be described.

Shaft 10 is supported for rotary movement in a pair of mutually spaced bearing members 18 and 20, respectively. Bearing member 18 is annular in shape and receives an intermediate portion of shaft 10, and bearing 20 provides a socket 22 for the reception of one end of the shaft 10. Longitudinal movement of shaft 10 to the right relative to the bearings as viewed in FIG. 1 is prevented by engagement of the bottom of the socket provided by bearing member 20 with the adjacent end of shaft 10. Longitudinal movement of shaft 10 in the opposite direction is prevented by a conventional split ring 24 retained in a groove provided by the shaft.

Shaft 10 fixedly carries a cam member 26 for movement therewith. Disposed between bearing members 18 and 20 and radially outwardly of cam member 26 is an annular cam-following member 28. Cam member 26 provides a pair of cam surfaces 30 and 32 and another pair of cam surfaces 34 and 36. Cam surfaces 34 and 36 have a constant radius of curvature about the axis of rotation of shaft 10, and cam surfaces 30 and 32 interconnect and are inclined relative to cam surfaces 34 and 36. Cam-following member 28 carries an inwardly extending projection 38 engaged with cam member 26 throughout 360° of rotation of the latter.

Cam-following member 28 is supported in position about the adjacent portion of shaft 10 and about cam member 26 by means of a pair of bellows 40 and 42. Each of bellows 40 and 42 is, per se, of conventional form well known in the art. In this regard, each of the bellows is tubular and formed of a resiliently stiff material such as beryllium copper or stainless steel such that it is substantially rigid in torsion and stiff but yieldable in lateral deflection under a positive force. That is, very little flexure of each of the bellows occurs when one end of the bellows is immovably held and a substantial torque is applied to the other end thereof; and a significant amount of flexure occurs when one end of the bellows is again immovably held and a positive lateral force is applied to the opposite end thereof. By "positive" force as used herein is meant a non-yielding and/or comparatively heavy force. One end, 44 and 46, respectively, of each of bellows 40 and 42 is hermetically sealed about an axially extending portion 48 and 50 provided respectively by bearing members 18 and 20. The opposite end, 52 and 54, respectively, of each of bellows 40 and 42 is likewise hermetically sealed as by brazing about the proximal axially extending portion 56 and 58 provided by cam-following member 28.

Operation of the motion translating mechanism as described above is as follows. Upon rotation of shaft 10 and cam member 26 in the direction of the arrows in FIGS. 3 and 4 from the position shown in FIG. 2 to that shown in FIG. 3, cam surface 34 moves along and in engagement with projection 38 provided by the cam-following member until the latter comes into engagement with inclined cam surface 30. The comparatively slight torque on each of bellows 40 and 42 due to the very slight frictional force between cam surface 34 and projection 38 is insufficient to overcome the torsional rigidity of each of the bellows as described above or laterally to deflect the cam-following member. Upon further rotation of shaft 10 and cam member 26 in the same direction, projection 38 comes into engagement with inclined cam surface 30. Upon engagement and during movement of inclined cam surface 30 along projection 38, the former exerts a force on the latter having two components extending perpendicular to the axis of rotation of the shaft 10. The first of these force components extends in the horizontal direction as viewed in FIGS. 2–4 tending not only to deflect ends 52 and 54 of bellows 40 and 42 laterally in the direction of the component force but also tending to rotate the cam-following member in the direction of rotation of the shaft and cam member. Horizontal lateral deflection of ends 52 and 54 of bellows 40 and 42 is prevented by the engagement of cam surface 36 with the internal surface portion of cam-following member 28 then engaged with cam surface 36 (see particularly FIG. 3). The torque developed through cam-following member 28 against respective ends 52 and 54 of the bellows due to this horizontal lateral force component is effectively resisted by the torsional rigidity of the bellows as described above. Accordingly, this horizontal component of force will effect neither lateral deflection of the cam-following member in the direction of this component nor rotation of the cam-following member. The other component of force extends vertically downward as viewed in FIGS. 2–4, at right angles to said first lateral component of force and tends to depress cam-following member 28. Bellows 40 and 42, being stiff but yieldable in lateral deflection under a positive force, ends 52 and 54 along with cam-following member 28 move downwardly and are depressed under the force exerted by cam member 26 against cam-following member 28 during movement of inclined cam surface 30 along projection 38. Just as cam surface 36 engages the adjacent surface of and prevents cam-following member 28 from being deflected not only laterally in a horizontal direction as viewed in FIGS. 2–4 but also rotationally during rotary movement of shaft 10 and cam member 26 in the direction of the arrows in each of FIGS. 3 and 4, so are lateral and rotational movement of cam-following member 28 and ends 52 and 54 of the bellows prevented from occurring in the respective opposite directions as inclined cam surface 30 rides along projection 38 of cam-following member 28 upon further rotation of shaft 10. Furthermore, it will be clear that cam surface 36 is effective to prevent rotational and horizontal lateral movement of cam-following member 28 and respective ends 52 and 54 of the bellows upon rotation of rotary shaft 10 and cam member 26 in the direction opposite to that indicated by the arrows in FIGS. 3 and 4. By virtue of this arrangement, the motion translating mechanism just described is not only capable of being cycled by continuous rotation of the shaft and will repeat its cycle every 360°, but also, this motion translating mechanism is fully reversible.

The motion translating means described above is shown in the drawings as being supported by and partially disposed within a container or casing 60 of the position-indicating unit generally indicated by the reference numeral 62. Bearing member 20 is supported as by brazing to an interior surface of container 60. Container 60 provides an aperture 63 within which annular bearing member 18 is mounted as by brazing to the casing, and the latter is otherwise hermetically sealed from the circumambient atmosphere. Bearing member 18 being hermetically sealed within the aperture 63 provided by the casing 60; each of the ends of bellows 40 and 42 being hermetically sealed to the respectively adjacent, axially extending portions 48, 50, 56 and 58 of bearing member 18, cam-following member 28 and bearing member 20; and casing 60 being otherwise hermetically sealed from the circumambient atmosphere; the interior of casing 60, exteriorily of bellows 40 and 42, bearing members 18 and 20 and cam-following member 28, is hermetically sealed from the circumambient atmsophere. Likewise, the interior chamber formed by bearing members 18 and 20, bellows 40 and 42, and cam-following member 28 is hermetically sealed from the remainder of the interior of casing 60. This interior chamber is filled with a material 64 such as silicone grease and a packing ring 66 is provided within an interfitting groove in the portion of shaft 10 lying within annular bearing 18 to prevent the entry of moisture, dirt, etc. into this interior chamber.

U-shaped supporting member 68 is disposed within casing 60. Two supporting rods 70 and 72, respectively, are fixedly carried at their opposite ends by the respective legs of U-shaped member 68. Also disposed within casing 60 are a pair of single-pole, double-throw, snap-acting, electrical switches 74 and 76, respectively. Each of switches 74 and 76 provides a pair of apertures therethrough within which are received adjacent portions of supporting rods 70 and 72. A hollow cylindrical spacer member 78 is disposed about supporting rod 72 and between switches 74 and 76 fixedly to retain the latter in mutually spaced relation.

Switches 74 and 76 are identical, and a detailed description of one will suffice for both. Taking switch 76, a casing 80 is provided within which is disposed a snap-acting element of the type fully described in U.S. Patent No. 2,630,504 to L. W. Burch et al. For the details of the structure and function of this type of snap-acting element, reference is made to this patent. Snap-acting element 82 is supported in tension at two spaced points by posts 84 and 86, respectively. With element 82 so supported, it is warped to the condition shown in FIGS. 3, 6 and 8 at which an arm 88 carrying an electrical contact 90 is biased into the position at which the latter contact is disposed in electrically conductive engagement with a stationary contact 92 carried by a terminal 94. Snap-acting element 82 is snappable, by means later to be described, to the condition shown in FIGS. 4, 7 and 9 at which another movable contact 96 carried by arm 88 is disposed in electrically conductive engagement with a stationary contact 98, the latter being carried by a terminal 100. Posts 84 and 86 are carried by a terminal-providing member 102 mounted in a base member 101 by means such as rivets 103, 103. Member 101 is formed of electrically insulating material and is fixedly disposed in casing 80, and all three of terminals 94, 100 and 102 are suitably connected to flexible, electrically insulated leads 104. The space adjacent the connections between leads 104 and each of terminals 94, 100 and 102 is filled with sealing compound 105.

A pivotal arm 106 is provided with a flange 108 bearing against a flexible diaphragm portion 110 of casing 80. Arm 106 further includes a reduced diameter portion 112 extending successively through interfitting apertures in flexible diaphragm portion 110 and a lever 114. Arm 106 is headed over at 116 tightly to secure the contiguous portions of arm 106, flexible portion 110 and lever 114 together. Upon pivotal movement of the lower end of arm 106 to the right due to depression of the left-hand end of lever 114 as viewed in FIG. 6, said lower portion of arm 106 moves against a pin 118 fixedly carried by snap-acting element 82 thereby to snap the latter from the position shown in FIGS. 3, 6 and 8 to the position shown in FIGS. 4, 7 and 9. When the force under which the left-hand end of lever 114 as viewed in FIG. 6 is released, the lower end of arm 106 is pivoted to the left permitting the snap-acting element 82 to snap back to the position shown in FIGS. 3, 6 and 8 under the resilient bias built up in the snap-acting element and flexible diaphragm portion 110 when the left-hand end of lever 114 was depressed.

The lever 114 of each of switches 74 and 76 is actuated by means of a T-shaped lever 120. Lever 120 includes a U-shaped portion 122 having apertures 124 through which supporting rod 70 extends pivotally to mount the T-shaped lever. As will be apparent from FIG. 2, U-shaped portion 122 aids spacer 78 in retaining switches 74 and 76 in spaced relation to each other. Lever 120 is resiliently biased in the counterclockwise direction about supporting rod 70 as viewed in FIG. 1 by means of a tension spring 126 having one end connected to lever 120 through an aperture 125 and its opposite end connected to an aperture 130 provided by the yoke of U-shaped supporting bracket 68. A pair of self-locking set screws 132, 132 are adjustably disposed in internally threaded apertures provided by T-shaped lever 120. A set screw 134 extends through an aperture 136 in T-shaped lever 120 and is fixedly secured in adjusted relation with respect to the latter by means of a self-locking clinch-nut 138 clinched onto lever 120.

Figure 7:
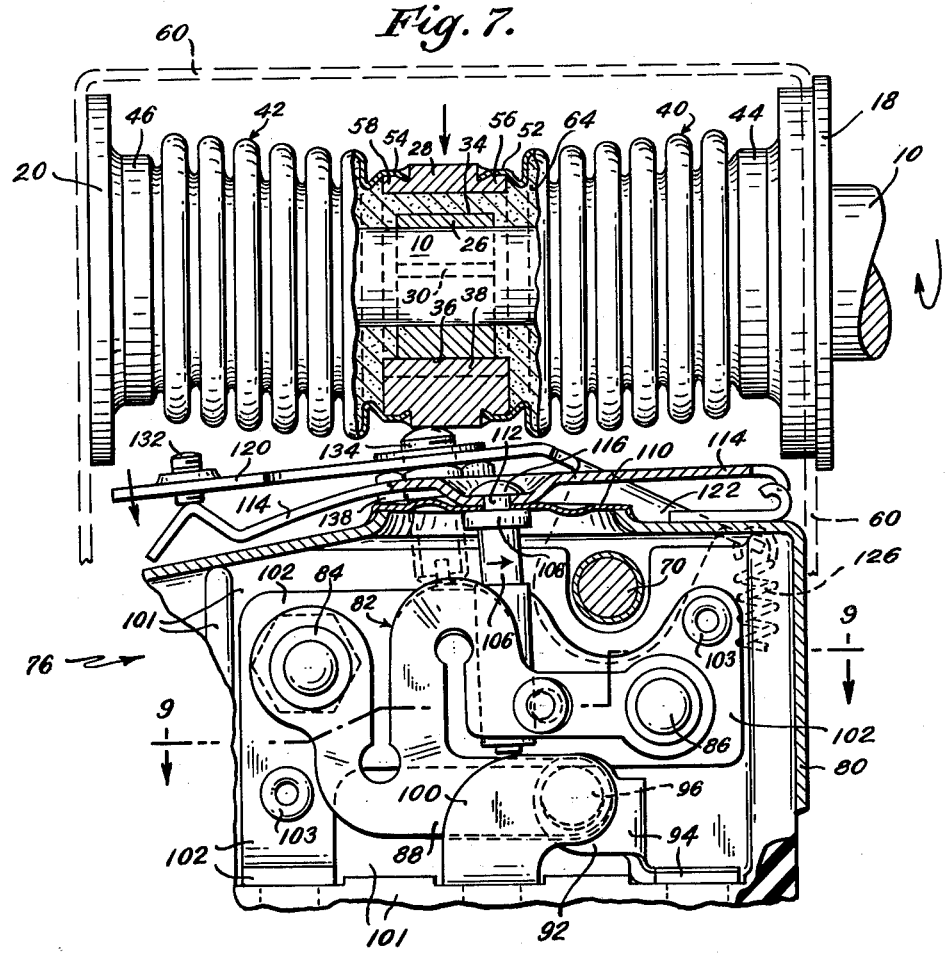
FIG. 7 is a sectional view taken along line 7—7 in FIG. 4.
Figure 8:
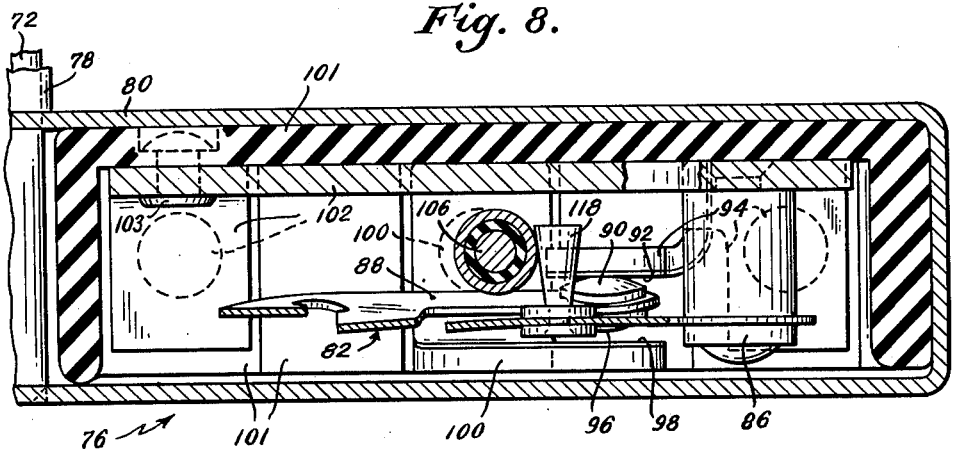
FIG. 8 is a sectional view taken along line 8—8 in FIG. 6.
Figure 9:
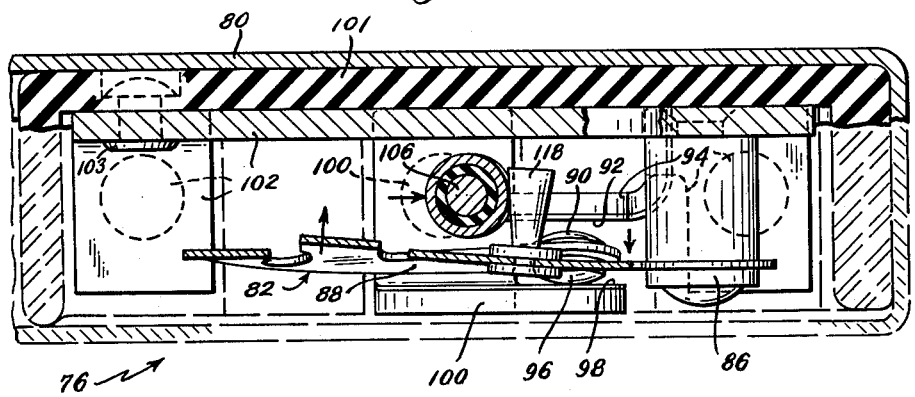
FIG. 9 is a sectional view taken along line 9—9 in FIG. 7.

It will be apparent that upon rotation of shaft 10 to depress cam-following member 28 as described above, T-shaped lever 114 will be pivoted in the counterclockwise direction about supporting rod 70 as viewed in FIG. 6 thereby to pivot lever 114 in the same direction about its mounting on flexible diaphragm portion 110 of the casing of each of switches 74 and 76 thereby to snap the snap-acting element 82 of each of the switches from the respective positions shown in FIGS. 3, 6 and 8 to the respective positions shown in FIGS. 4, 7 and 9. Upon further rotation of rotary shaft 10 and the resulting retraction of cam-following member 28, all as described above, levers 114 and 120 will be pivoted in the clockwise direction as viewed in FIG. 6 and the snap-acting element 82 of each of switches 74 and 76 will be snapped in the opposite direction back to the respective positions shown in FIGS. 3, 6 and 8. Leads 104 will be appropriately connected to signalling means such as on-off switches for indicating to the pilot of an aircraft the position of the landing gear.

In assembling unit 62, the motion translating mechanism comprising shaft 10, bearing members 18 and 20, cam-following member 28 and bellows 40 and 42 are assembled as a sub-assembly, and this sub-assembly is inserted and fixedly secured to casing 60 by brazing bearing members 18 and 20 to this casing as described above. A bottom casing member 140 is secured to the yoke of U-shaped supporting member 68 by welding or brazing, and a hollow tubular section 143 is secured by brazing at 144 in the opening provided by aligned apertures in members 68 and 140. A second sub-assembly is made up comprising U-shaped supporting member 68, bottom casing member 140, tubular section 143, supporting rods 70 and 72, switches 74 and 76, spacer member 78, levers 114 and 120, spring 126, and leads 104. This second sub-assembly is inserted into casing 60 from the bottom thereof, and bottom casing member 140 is brazed in place at 142. The brazing material at 142 and 144 hermetically seals the respective parts to each other. Potting compound 146 is then deposited from the outer end of tubular section 143 about the bottom of each of switches 74 and 76 to approximately the height shown in FIG. 2 entirely to surround the portions of all of leads 104 lying within member 143 and casing 60 and hermetically to close off the interior casing 60.

Brackets 148, 148 may be secured to casing 60 for supporting the position-indicating unit 62 at the desired location.

In view of the above, it will be seen that the several objects of the invention are achieved and other advantageous results attained.

Dimensions of certain of the parts as shown in the drawings have been modified for the purposes of clarity of illustration.

As many changes could be made in the above constructions without departing from the scope of the invention, it is intended that all matter contained in the above description or shown in the accompanying drawings, shall be interpreted as illustrative and not in a limiting sense.

I claim:

1. In combination, a cam-following member, a pair of longitudinally aligned tubular bellows members; each of said bellows members being substantially rigid in torsion but yieldable in lateral deflection in a direction transverse to the longitudinal axis of said bellows, one end of each of said bellows being connected to said cam-following member; means securing and fixing the opposite end of each of said bellows members against rotation; rotatably mounted, cam means operatively connected with said cam following member for deflecting the latter in a direction substantially normal to said longitudinal axis in response to rotation of said cam means; said bellows resisting rotational movement of said cam following member, when the latter is deflected by said cam means.

2. In combination, a pair of mutually spaced bearing members, an annular cam-following member lying between and spaced from said bearing members, and a pair of aligned tubular bellows members, each of said aligned bellows members being substantially rigid in torsion but yieldable in lateral deflection in a direction transverse to the longitudinal axis of said bellows members, one end of each of said bellows members being hermetically sealed about a respective one of said bearing members and the other end of each of said bellows being hermetically sealed about a respective end of the cam-following member, and a shaft mounting a cam member within said cam-following member for engagement therewith to deflect said cam following member in said direction upon rotation of said cam member; said bellows members resisting rotation of said cam following member, said shaft being supported by said bearing members.

3. A motion translating mechanism comprising a shaft, mutually spaced bearings supporting said shaft for rotation of the latter, a cam member mounted on said shaft for movement therewith, an annular cam-following member disposed radially about said cam member and intermediate said spaced bearings, and a pair of tubular bellows substantially rigid in torsion but yieldable in lateral deflection, each of said bellows being mounted at one end on a respective one of said bearings and at the other end on said cam-following member thereby to surround the respectively adjacent portions of said shaft, to resist rotary movement of the cam-following member and to permit lateral deflection of the cam-following member in response to rotation of the cam member.

4. A motion translating mechanism comprising a shaft; a pair of mutually spaced bearings mounting said shaft for rotation thereof; a cam member carried by said shaft for rotation therewith; an annular cam follower disposed radially outwardly of said cam member and between said bearings; and a pair of tubular bellows substantially rigid in torsion but yieldable in lateral deflection; each of said bellows extending from said cam follower member to one of said bearings thereby to surround the respectively adjacent portions of said shaft, to resist rotary movement of the cam-following member and to permit lateral deflection of the cam follower in response to rotation of the cam member.

5. In combination, a hollow casing providing an aperture therethrough and being otherwise hermetically sealed from the circumambient atmosphere; a rotary shaft extending through said aperture from the interior to the exterior of said casing; an annular bearing hermetically sealed within said aperture; a second bearing mounted within said casing in spaced relation to said annular bearing; said bearings mounting said shaft for rotation thereof; a cam member mounted on said shaft; an annular cam-following member disposed in operative relation with and about said cam member and between said bearings; a pair of tubular bellows; each of said bellows being substantially rigid in torsion but yieldable in lateral deflection; each of said bellows having one end hermetically sealed to said cam-following member and having its opposite end hermetically sealed to one of said bearings thereby hermetically to seal the interior of said casing exteriorly of said bellows, bearings and cam-following member; and electrical switch means positioned for operative engagement with said cam-following member for actuation in response to rotation of said shaft.

6. In combination, a pair of spaced bearing members; a cam-following member disposed between and spaced from each of said bearing members; a pair of tubular members, each of said tubular members being substantially rigid to resist torsional deflection in one direction but yieldable in deflection in another direction; one end of each of said tubular members being secured to and hermetically sealed about a respective one of the bearing members and the other end of each of said tubular members supporting and being hermetically sealed about a respective end of the cam-following member; and cam means for deflecting said cam-following member in said another direction.

7. The combination as set forth in claim 6 and wherein said cam means includes a cam surface engageable with said cam-following member to resist deflection of said cam-following member in a third direction while permitting deflection of said member in said another direction, said another and third directions being substantially at right angles to each other.

8. A motion translating mechanism comprising a shaft; means including a pair of spaced bearings mounting said shaft for rotation thereof; a cam member carried by said shaft for rotation in response to rotation of said shaft; a cam-follower member arranged intermediate said bearings for engagement by said cam member; a pair of tubular members substantially rigid in torsion but yieldable in lateral deflection, each of said tubular members being secured at one end thereof to a respective one of said bearings, the opposite ends of each of said tubular members being secured to and supporting said cam-follower member, said tubular members surrounding the adjacent portion of said shaft intermediate said cam member and its respective bearing, said tubular members thereby resisting rotational movement of said cam-following member and permitting lateral deflection thereof in response to rotation of said cam member.

9. A motion translating mechanism comprising a shaft; a pair of spaced bearings mounting said shaft for rotation thereof; a cam member carried by said shaft for rotation in response to rotation of said shaft; a cam-follower member arranged intermediate said bearings for engagement by said cam member; a pair of tubular members substantially rigid in torsion but yieldable in lateral deflection, each of said tubular members being secured at one end thereof to a respective one of said bearings, the opposite ends of each of said tubular members being secured to and supporting said cam-follower member, said tubular members surrounding the adjacent portion of said shaft intermediate said cam member and its respective bearing, said tubular members thereby resisting rotational movement of said cam-following member and permitting lateral deflection thereof in response to rotation of said cam member; and said tubular members being hermetically sealed at each end about its respective bearing and said cam-follower member.

10. A motion translating mechanism comprising a shaft; a pair of spaced bearings mounting said shaft for rotation thereof; a cam member carried by said shaft for rotation in response to rotation of said shaft; a cam-follower member arranged intermediate said bearings for engagement by said cam member; a pair of tubular members substantially rigid in torsion but yieldable in lateral deflection, each of said tubular members being secured at one end thereof to a respective one of said bearings, the opposite ends of each of said tubular members being secured to and supporting said cam-follower member, said tubular members surrounding the adjacent portion of said shaft intermediate said cam member and its respective bearing, said tubular members thereby resisting rotational movement of said cam-following member and permitting lateral deflection thereof in response to rotation of said cam member; and said cam member including a cam surface engageable with said cam-following member to resist lateral deflection thereof in one direction while permitting lateral deflection thereof in another direction substantially at right angles to said one direction.

11. In combination, a cam-following member, a pair of tubular bellows, each of said bellows being substantially rigid in torsion but yieldable in lateral deflection, one end of each of said bellows being secured to said cam-following member; means securing the opposite end of each of said bellows against rotation; cam means; and means rotatably supporting said cam means for engagement with said cam-following member to laterally deflect the latter; said bellows resisting rotation of said cam following member when the latter is deflected by said cam means; and said cam means including a cam surface engageable with said cam-following member to resist lateral deflection of said cam following member in one direction while permitting lateral deflection thereof in a direction substantially at right angles to said one direction.

12. In combination: a hermetically sealed housing including a pair of opposed spaced apart walls; one of said walls providing an opening, an annular bearing mounted in said opening in hermetically sealed relation to said housing; a second bearing mounted within said housing on said other wall in spaced aligned and registering relation to said annular bearing; said bearings mounting a shaft for rotation; a cam member mounted on said shaft for rotation with said shaft; an annular cam following member positioned between said bearings and telescopically disposed about said shaft and cam member; a pair of tubular bellows; each of said bellows being substantially rigid in torsion but yieldable for lateral deflection; each of said bellows being telescopically disposed about said shaft; one end of each of said bellows being hermetically sealed and fixedly secured to said cam following member; the other end of each of said bellows being hermetically sealed and fixedly secured to a respective one of said bearings thereby hermetically sealing the interior of said casing exteriorly of said bellows, bearing and cam following members; a device disposed within said housing and positioned for engagement with said cam following member for actuation thereof in response to a predetermined rotation of said shaft and lateral deflection of said cam following member.

References Cited in the file of this patent

UNITED STATES PATENTS

| | | |
|---|---|---|
| 701,615 | Reichenbach | June 3, 1902 |
| 2,133,358 | McCormack | Oct. 18, 1938 |
| 2,221,942 | Carlson | Nov. 19, 1940 |
| 2,255,172 | Johnson | Sept. 9, 1941 |
| 2,431,200 | Rosenberger | Nov. 18, 1947 |
| 2,794,889 | Bachman et al. | June 4, 1957 |
| 2,795,959 | Roeser | June 18, 1957 |
| 2,837,926 | Korsgren et al. | June 10, 1958 |
| 2,863,336 | Parstorfer | Dec. 9, 1958 |
| 2,875,621 | Peters | Mar. 3, 1959 |
| 2,878,348 | Haydon et al. | Mar. 17, 1959 |

FOREIGN PATENTS

| | | |
|---|---|---|
| 217,306 | Switzerland | Oct. 15, 1941 |